No. 734,506. PATENTED JULY 28, 1903.
G. M. BURBANK.
CEMENT RAILWAY TIE.
APPLICATION FILED FEB. 17, 1903.
NO MODEL.
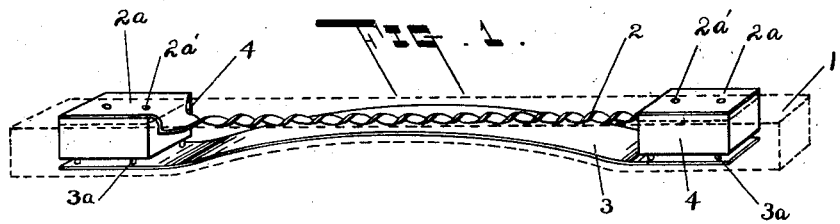
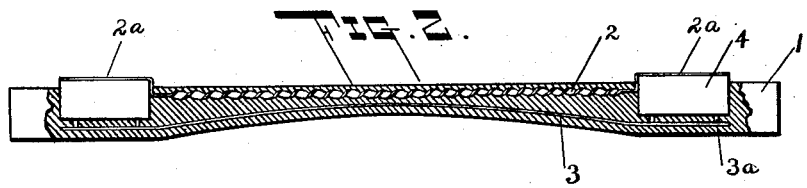
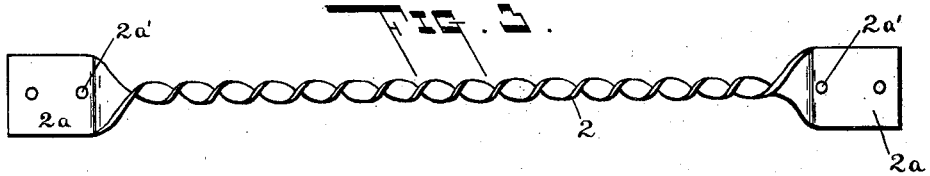
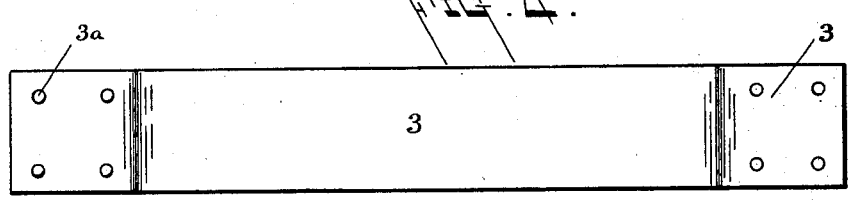
WITNESSES:
James C. Hanson.
P. M. Holdsworth.
Geo. M. Burbank INVENTOR
BY
Geo. B. Willcox ATTORNEY No. 734,506. Patented July 28, 1903.

UNITED STATES PATENT OFFICE.

GEORGE M. BURBANK, OF BAY CITY, MICHIGAN.

CEMENT RAILWAY-TIE.

SPECIFICATION forming part of Letters Patent No. 734,506, dated July 28, 1903.

Application filed February 17, 1903. Serial No. 143,793. (No model.)

*To all whom it may concern:*

Be it known that I, GEORGE M. BURBANK, a citizen of the United States, residing at Bay City, in the county of Bay and State of Michigan, have invented certain new and useful Improvements in Cement Railway-Ties; and I do hereby declare the following to be a full, clear, and exact description of the invention, such as will enable others skilled in the art to which it appertains to make and use the same.

This invention is a cement railway-tie.

The object of the invention is to produce a cement or concrete tie that is of light construction built upon a framework of such strength that it can be shipped and subjected to rough handling without danger of breaking.

My invention is illustrated in the accompanying drawings, in which—

Figure 1 is a perspective view of the composite framework on which the tie is molded, the outline of the surrounding cement being shown by dotted lines. Fig. 2 is a side elevation of the tie with the cement body partly in section. Fig. 3 is a plan view of the upper twisted tie-bar, and Fig. 4 is a plan view of the lower stiffening-plate.

As is shown in the drawings, the tie is composed of a cement body 1, molded around a stiffening-framework consisting of an upper twisted tie-bar 2 and a lower upwardly-bowed stiffening-plate 3, separated at their ends by wooden blocks 4. The principal object of the blocks is to form a resilient support for the rails, and for this purpose they extend above the surface of the cement, so that they can wear down in use a considerable amount before their upper surface is low enough to let the rail touch the cement body. Each end of the bar 2 is turned upwardly, projecting above the surface of the cement near one of the blocks 4, and a flat plate $2^a$, adapted to cover the block and act as a tie-plate or bearing-plate for the rail, is welded to it. The plates $2^a$ have holes $2^{a'}$, through which spikes are driven to secure the rails to the blocks 4. The rails are thus securely held to gage and prevented from spreading. The twisting of the bar 2 gives it a firm hold in the cement throughout its entire length. If desired, the tie-bar 2 may be made large enough to permit of flattening its ends to form the plates $2^a$.

The lower stiffening-plate 3, extending under each of the blocks 4, has upwardly-projecting pins $3^a$, which give it a firm hold at the ends in the cement body. They serve the additional purpose of separating the ends of the plate from the blocks and of holding the parts of the stiffening-frame in the proper relative position while molding the cement body. These pins $3^a$ are securely riveted into the plate at their lower ends. The lower face of the cement body may be upwardly bowed in a curve parallel to the stiffening-plate 3, thus reducing the size and weight.

By the means above described I have produced a railway-tie having solidly-embedded and well-protected resilient bearing-blocks and which is stiffened and tied together by metal parts completely surrounded and protected by the cement body. Means are also included within the tie to prevent the rails from spreading without depending alone on the holding power of the cement body or the wooden blocks.

What I claim as my invention, and desire to secure by Letters Patent, is—

1. A railway-tie comprising in combination a cement body; a wooden block near each end molded into the cement body and projecting above the upper surface, said blocks being adapted to carry the rails; a twisted flat bar connecting the wooden blocks, that portion of said bar between the blocks being entirely surrounded by the cement body; holes in each end of said bar adapted to receive spikes driven each side of the rail for holding the rail to the wooden blocks; a plate within the cement body near and parallel to the lower face thereof and extending under the wooden blocks; and upwardly-projecting pins secured to said plate.

2. In combination with a cement railway-tie wooden blocks adapted to carry the rails; and a bar connecting said wooden blocks; said bar having holes in each end adapted to receive spikes driven on each side of the rail securing the rails to the blocks.

3. In combination with a cement railway-tie having wooden blocks near the ends adapted to carry the rails; a plate within the cement near and parallel to the lower surface of the tie and extending under the wooden blocks, said plate having upwardly-projecting pins on its upper surface.

4. A railway-tie comprising in combination a cement girder having its lower surface upwardly bowed; wooden blocks embedded in the cement girder and projecting above its upper surface, said blocks being adapted to carry the railroad-rails; a twisted flat bar having flat ends adapted to cover the upper surface of the wooden blocks; the portion of the bar between the blocks being entirely embedded within the cement girder; holes in the ends of the twisted bar adapted to receive spikes driven on each side of the rails securing them to the wooden blocks; an upwardly-bowed flat plate entirely embedded within the cement girder, extending near and parallel to its lower side and under the wooden blocks; together with upwardly-extending pins carried by said plate, adapted to fix the distance between the blocks and the plate.

5. In a cement railway-tie having resilient bearing-blocks embedded therein, adapted to carry the rails, a twisted flat bar extending lengthwise the tie and inclosed within the cement, and flat ends on said bar turned upwardly to project out of the cement and outwardly to cover the tops of the bearing-blocks for the purpose set forth.

6. A railway-tie comprising in combination a cement girder having its lower surface upwardly bowed; wooden blocks embedded in the cement girder and projecting above its upper surface, said blocks being adapted to carry the railway-rails; a twisted flat bar within the body of the girder between the blocks; ends on said bar turned upwardly to project above the surface of the cement and turned outwardly and flattened to cover the upper surface of the wooden blocks; holes in said flattened ends adapted to receive spikes driven on each side of the rails securing them to the wooden blocks; an upwardly-bowed flat plate entirely within the cement girder, extending near and parallel to the lower side thereof; and upwardly-extending pins carried by said plate adapted to fix the distance between the blocks and the plate.

In testimony whereof I affix my signature in presence of two witnesses.

GEORGE M. BURBANK.

Witnesses:
P. M. HOLDSWORTH,
JAMES C. HANSON.